United States Patent [19]

Johnson et al.

[11] Patent Number: 4,935,932
[45] Date of Patent: Jun. 19, 1990

[54] APPARATUS USING INDUCED BIREFRINGENCE TO IMPROVE LASER BEAM QUALITY

[75] Inventors: Bertram C. Johnson, Sunnyvale; John C. DiFonzo, San Mateo County; Richard L. Herbst, Palo Alto, all of Calif.

[73] Assignee: Spectra-Physics, Inc., San Jose, Calif.

[21] Appl. No.: 232,446

[22] Filed: Aug. 15, 1988

[51] Int. Cl.$^5$ .............................................. H01S 3/00
[52] U.S. Cl. ...................................... 372/33; 372/105; 372/106; 372/27
[58] Field of Search ................ 372/105, 27, 108, 106, 372/33

[56] References Cited

U.S. PATENT DOCUMENTS

| | | | |
|---|---|---|---|
| 3,530,402 | 9/1970 | Doyle et al. | 372/105 |
| 3,564,454 | 2/1971 | Hook et al. | 372/105 |
| 3,596,201 | 7/1971 | Chester | 372/106 |
| 3,628,173 | 12/1971 | Danielmeyer | 331/94.5 |
| 3,662,281 | 5/1972 | Koechner | 378/105 |
| 3,702,974 | 11/1972 | Koechner et al. | 372/106 |
| 3,713,032 | 1/1973 | Wentz | 331/94.5 |
| 3,777,280 | 12/1973 | Pohl | 331/94.5 |
| 4,276,518 | 6/1981 | Ferguson | 331/94.5 |
| 4,408,334 | 10/1983 | Lundstrom | 372/98 |
| 4,461,009 | 7/1984 | Lundstrom | 372/106 |
| 4,575,849 | 3/1986 | Chun | 372/9 |
| 4,701,929 | 10/1987 | Baer et al. | 372/27 |
| 4,734,912 | 3/1988 | Scerbak et al. | 372/27 |

FOREIGN PATENT DOCUMENTS

| | | | |
|---|---|---|---|
| 0043787 | 4/1981 | Japan | 372/27 |
| 8603066 | 5/1986 | United Kingdom | 372/105 |

OTHER PUBLICATIONS

AN Nd: YAG Laser Whose Active Medium Experiences No Hole Burning Effects, D. J. DeJong and D. Andreou, Optics Communications, vol. 22, No. 2, Aug. 1977.
Solid-State Laser Engineering, Walter Koechner; Springer Series in Optical Sciences, Springer-Verlag, 1976.
Walter Koechner, *Applied Optics*, vol. 9, No. 6, Jun. 1970.

*Primary Examiner*—Léon Scott, Jr.
*Attorney, Agent, or Firm*—Fliesler, Dubb, Meyer & Lovejoy

[57] ABSTRACT

A laser beam shaper which provides polarized output with a high spatial quality, utilizing induced stress birefringence. The laser beam shaper in which light resonates along a resonant path defined by reflective surfaces includes a solid state medium, such as a Nd:YAG rod which exhibits thermally induced stress birefringence that is of known, azimuthally independent distribution in planes perpendicular to the resonant path. On either side of the medium, quarter-wave retardation plates are provided which create essentially circular polarization of the resonant light within the medium. Sandwiching the quarter-wave plates and the medium are the first and second polarizing elements, both of which are aligned along the same preferred plane. By inducing stress birefringence in the medium, an output beam is produced. A shape defined by the distribution of the birefringence is provided. With media such as YAG, the shape of the beam is round with high quality.

28 Claims, 4 Drawing Sheets

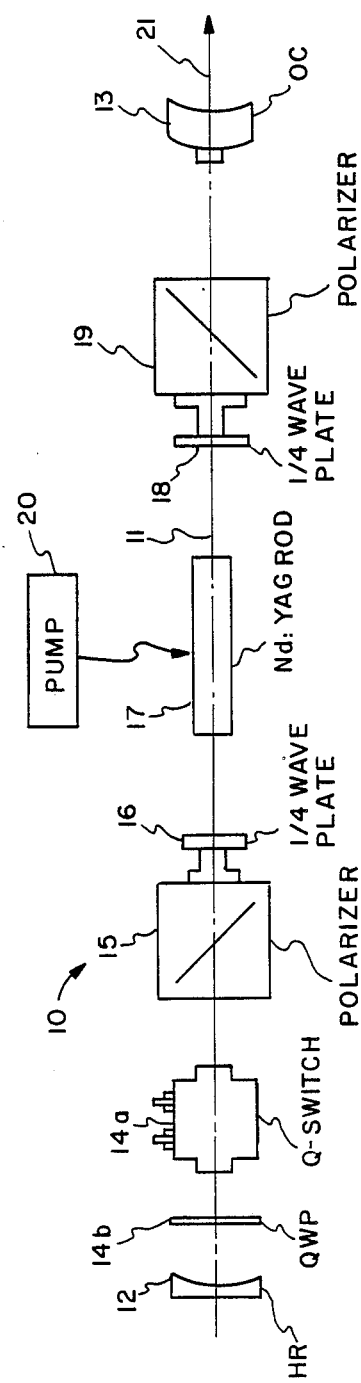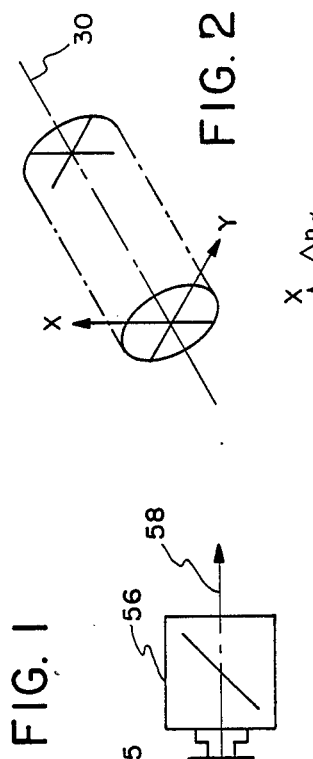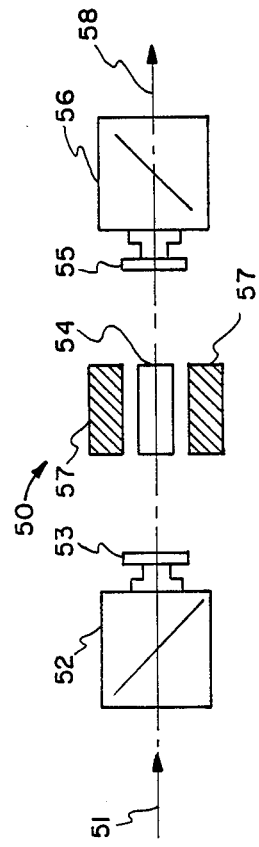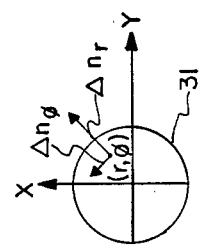

APPARATUS USING INDUCED BIREFRINGENCE TO IMPROVE LASER BEAM QUALITY

BACKGROUND OF THE INVENTION

1. Field of the Invention

The present invention relates to apparatus producing a polarized laser beam with high quality spatial characteristics. In particular, the present invention applies to solid state media in the path of a laser beam which exhibit thermally induced stress birefringence for improving beam quality.

2. Description of Related Art

Many solid state lasers exhibit birefringence induced by thermal stress in the lasing medium. The birefringence within the medium has a complex effect on the transverse distribution of power within the beam. In lasers requiring polarized output and control of transverse modes, the induced birefringence places an upper limit on the power at which the medium may be operated in the prior art.

The birefringence phenomenon is especially difficult to eliminate because its distribution follows a cross-section of the lasing medium and the distribution of energy absorbed within that cross-section. Thus, to compensate for induced stress birefringence with wave retardation elements, one must either find elements that match the medium or design the medium to match an available wave retardation optic. In solid state rods, the most common form of solid state media, the birefringence takes on a radial distribution. Because this distribution does not match commonly available wave retardation optics, various special optical elements have been devised to compensate for the induced birefringence with limited success (see Koechner, *Applied Optics*, Vol. 9, NO. 6, June 1970; see also U.S. Pat. No. 4,408,334, entitled WAVE PLATE FOR CORRECTING THERMALLY-INDUCED STRESS BIREFRINGENCE IN SOLID STATE LASERS; issued Oct. 4, 1983; inventor Lundstrom).

Accordingly, when the power of a solid state laser which exhibits thermally-induced stress birefringence is increased, the magnitude of the birefringence increases within the medium. As the magnitude increases according to the teaching of prior art systems, the spatial quality of the output beam suffers. Thus, a need exists for a high power solid state laser that generates a beam with high spatial quality.

Aside from prior art systems designed to compensate for birefringence, there exists a variety of applications for round laser beams. However, assuring that a given beam is round, in the prior art, is extremely difficult.

SUMMARY OF THE INVENTION

The present invention is an apparatus which provides a polarized output beam with high spatial quality, by taking advantage of the induced birefringence, rather than attempting to compensate for it. The invention operates by distributing symmetrically the depolarization effects of the thermally induced stress birefringence during buildup of a laser pulse and by inhibiting the amplification of the resulting depolarized energy. The result in a preferred system described below, is a round output beam of high quality with a relatively small energy penalty.

Accordingly, in one aspect, the present invention comprises the laser resonator in which light resonates along a resonant path defined by reflectors. A solid state medium is provided, such as a Nd:YAG rod, which exhibits thermally induced stress birefringence that is azimuthally independent in planes perpendicular to the resonant path. On either side of the medium, quarter-wave retardation plates are provided which create essentially circular polarization of the resonant light within the medium. On either side of the quarter-wave plates and the medium are the first and second polarizing elements, both of which are aligned along the same preferred plane. Thus, resonant light will pass from a first polarizer into a quarter-wave plate at a first polarization. It will leave the quarter-wave plate with an essentially circular polarization and pass through the medium. At the output of the medium, the second quarter-wave plate will cancel the effect of the first quarter-wave plate. At the output of the second quarter-wave plate, a beam symmetrically exhibiting the depolarization effects of the birefringence within the medium is produced. The second polarizing element rejects portions of the beam supplied at the output of the second quarter-wave plate, that are misaligned with the preferred orientation. The output of the second polarizing element exhibits a circular profile reflecting the distribution of the birefringent phenomenon. The radius of the circular output beam can be controlled by varying the magnitude of pumping power in the medium. Accordingly, not only does the output beam have a high spatial quality, but the controllable stress birefringence can be used as a variable radius apodizer and beam shaper.

According to an alternate embodiment, the active medium exhibiting the birefringence is the lasing medium.

Other characteristics of the present invention can be understood from a study of the drawings and the specification which follow.

DESCRIPTION OF THE DRAWINGS

FIG. 1 is a diagram of the laser resonator according to the present invention.

FIG. 2 is a graph illustrating a coordinate system for a rod.

FIG. 3 is a graph illustrating the birefringence effect in a medium according to the present invention, with respect to the coordinate system of FIG. 2.

FIG. 7 is a diagram of an apparatus according to the present invention, for apodizing or shaping a beam of light generated elsewhere.

DESCRIPTION OF THE PREFERRED EMBODIMENT

Figure 4:
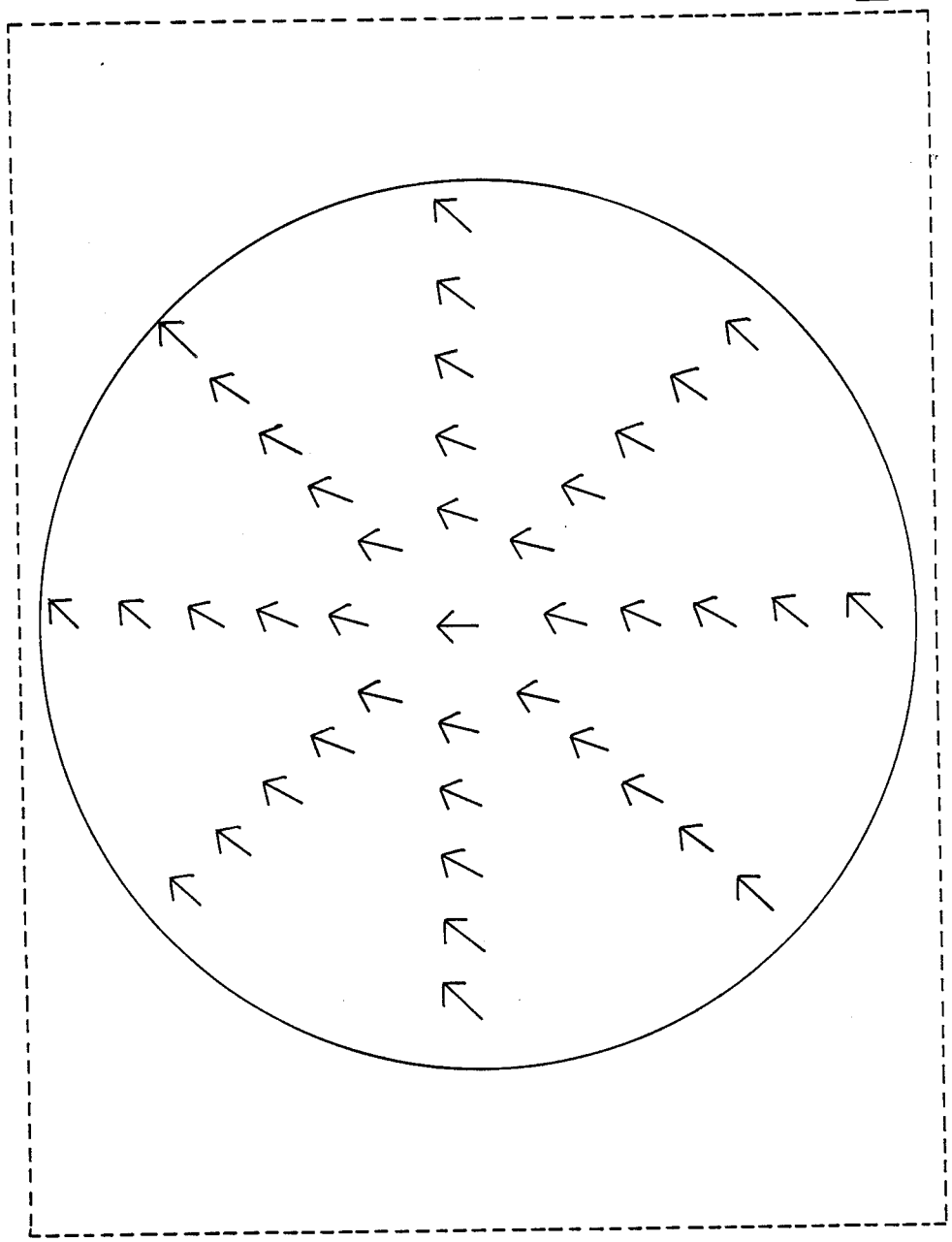
FIG. 4 is a diagram illustrating polarization of the beam as it travels from the second quarter-wave plate to the second polarizing element in the system of FIG. 1.

The present invention is described with reference to the figures. FIG. 1 illustrates a laser resonator according to the present invention. The operation of the laser resonator is described with respect to FIGS. 2–6. FIG.

7 illustrates an alternative application of the present invention as an apodizer or beam shaper.

A. Laser Resonator Arrangement

As illustrated in FIG. 1, the laser resonator includes a resonant path illustrated by the dashed line 11. At a first end of the resonant path is a highly reflective surface 12. At a second end of the resonant path 11 is an output coupler 13. In the preferred system, a Q-switch 14a, 14b is provided for causing pulsed beams. Q-switch 14a, 14b includes a quarter-wave plate 14b which prevents oscillation in the resonator until a voltage is applied to the active element 14a which cancels the effect of the quarter-wave plate 14b.

Also, along the resonant path 11 are a first polarizer 15, a first quarter-wave plate 16, a lasing medium 17, a second quarter-wave plate 18, and a second polarizer 19. The quarter-wave plates 16, 18 could be replaced by properly biased Pockel cells, or other equivalent optics known in the art.

The lasing medium 17, such as an Nd:YAG cylindrical rod, exhibits thermally induced stress birefringence of a known distribution that is essentially azimuthally independent and increases in magnitude with power dissipation in the rod, and quadratically with radius r from the center of the rod (see Koechner, *Solid-State Laser Engineering,* Chapter 7, 1976). The distribution is "essentially" azimuthal, rather than "azimuthal" because processing variations in forming the media may cause minor aberrations in predicted distributions. A wide variety of active media are characterized by azimuthally independent distribution when formed into cylindrical rods, such as Nd:YAG. Examples include rod-shaped glass, cubic crystals other than YAG, and other anisotropic solid media. Media of other shapes could be used as desired to produce other known distributions of the birefringence.

The graphs of FIGS. 2 and 3 can be referred to for explanation of the distribution of birefringence in the lasing medium according to the present invention. FIG. 2 is a graph showing a cylindrical rod with a longitudinal axis 30 which should be aligned with the resonant axis 11 of the laser resonator in which the lasing medium is placed. In the plane perpendicular to the longitudinal axis 30, X and Y axes are illustrated. FIG. 3 is a view of the X—Y plane through the cylinder of FIG. 2. The circumference of the rod is illustrated at 31. For a cubic crystal, such as Nd:YAG, or Nd:glass or other isotropic materials, as the temperature gradient is increased in a rod made of the crystal, the index of refraction at a point $(r,\Phi)$ will change in the radial and tangential directions according to known azimuthally independent distributions (azimuthally independent means independent of the angle $\Phi$ of FIG. 3.) Thus, a change in the index of refraction of the radial direction $\Delta n_r$ will be caused, and a change in the index of refraction in the tangential direction $\Delta n\Phi$ will be caused. In addition, the magnitude of the changes in the index of refraction in the media will be proportional to $r^2$. Accordingly, the magnitude of $\Delta n_r$ can be expressed as $q_r r^2$ where $q_r$ is a factor determined by the power input to the rod. Likewise, the magnitude of the tangential change in index of refraction can be expressed as $q_{101} r^2$ where $q_{101}$ is a proportionality factor based on the power input to the rod. By increasing the input pump power, the magnitude of the changes in index of refraction increases, but the directions do not change.

The first polarizer 15 and second polarizer 19 are aligned to pass plane-polarized light at the same orientation, for instance, the X-direction of FIG. 3. The first quarter-wave plate 16 is aligned with its principal axis 45 degrees from the principal axis of the first polarizer 15. The second quarter-wave plate 18 is aligned with its principal axis minus 45 degrees from the principal axis of the second polarizer 19. In this way, the second quarter-wave plate is oriented so that retardation caused by the first quarter-wave plate, is aligned with acceleration caused by the second. Without stress birefringence, two counter-propagating, elliptically polarized traveling waves are introduced into the lasing medium. The elliptical polarization in the preferred system is circular or near circular so that the depolarization effect of birefringence is sampled in an essentially azimuthally independent manner by the beam.

A laser pump 20 is included which drives the lasing medium, such as a flash lamp or other laser supplying a high intensity light. The intensity of the pump radiation induces heat in the lasing medium, thereby causing thermally induced stress birefringence. The resulting output beam 21 exhibits very high quality circularity, the diameter of which can be controlled by varying magnitude of stress birefringence in the lasing medium 17. The higher the stress birefringence in the rod, the smaller the output beam 21. The energy inducing stress birefringence in the rod may be supplied solely by the laser pump, by a combination of the laser pump energy with energy supplied from other sources, such as a heater coupled to the medium, or solely from an energy source other than the laser pump. A heater suitable for this application could be formed by a graphite sheath around the active medium, heated by radio wave telemetry.

The present invention has been demonstrated using a Nd:YAG rod, approximately 1 per cent Nd by weight, 8¼ millimeters in diameter and 62 millimeters in length, pumped by a xenon lamp. It is determined that the apodizing effect of the induced stress birefringence is observed running this medium at 30Hz with 90 joules per pulse average power. It is observed that at 10Hz, 90 joules per pulse average power in the demonstrated system, the induced stress birefringence is insufficient to generate the shaping effect of the present invention.

In addition to control of the spatial quality of the beam, the induced stress birefringence is found to suppress parasitic modes in the lasing medium, by providing an apodizing effect that suppresses oscillation near rod edges. Accordingly, overall quality of the laser resonator output is improved by inducing stress birefringence in a lasing medium with a minimal loss in output power.

B. Analysis of System

Operation of the laser resonator 10 shown in FIG. 1 can be understood by tracing the effect on the laser beam as it passes from the first polarizer 15 out the second polarizer 19. Light leaving the first polarizer 15 is polarized according to a preferred orientation (the x-direction). The first quarter-wave plate 16 causes the wave to become essentially circularly polarized. The circularly polarized beam samples the birefringence uniformly, such that the depolarizing effect on the transmitted power of the beam is equal at all points in the rod at equal radii from the center. On passing through the second quarter-wave plate, the beam loses any ellipticity it gained in the rod due to birefringence and consists of totally linearly polarized light. However, the distribution of polarization of the light is no longer of a single orientation. Rather, it is distributed as illustrated in FIG. 4 where the tilt of polarization increases from the preferred X-direction polarization supplied by the first polarizer, as distance from the center of the rod increases. Upon passing through the second polarizer 19, components of the beam not aligned with the X-axis are removed. This configuration is analogous to a circular polariscope, except that the polarizers according to the present invention are aligned to retain the polarized component and reject the depolarized component in the beam. Due to the induced birefringence in the rod, the output beam will have a transverse cross-section shaped according to the distribution of the birefringence in the rod. For active media that exhibit circularly symmetrical birefringence, the cross-section is circular.

The effect of the combination of the quarter-wave plates and the first polarizer is to remove the asymmetry associated with the beam's polarization. In addition, the birefringence in the rod results in rotation of the polarization. Without the quarter-wave plates, the linearly polarized beam entering the rod would exit the rod with a complex distribution of elliptical polarities. Instead, with the quarter waves plates, the beam exits the second quarter-wave plate as shown in FIG. 4. Note that without the second polarizer, the radial array of polarizations would deflect off the mirror and re-enter the quarter-wave plate/rod pair where the polarization array would unwind, see the same birefringence again and regain the ellipticity it had lost.

Figure 5:
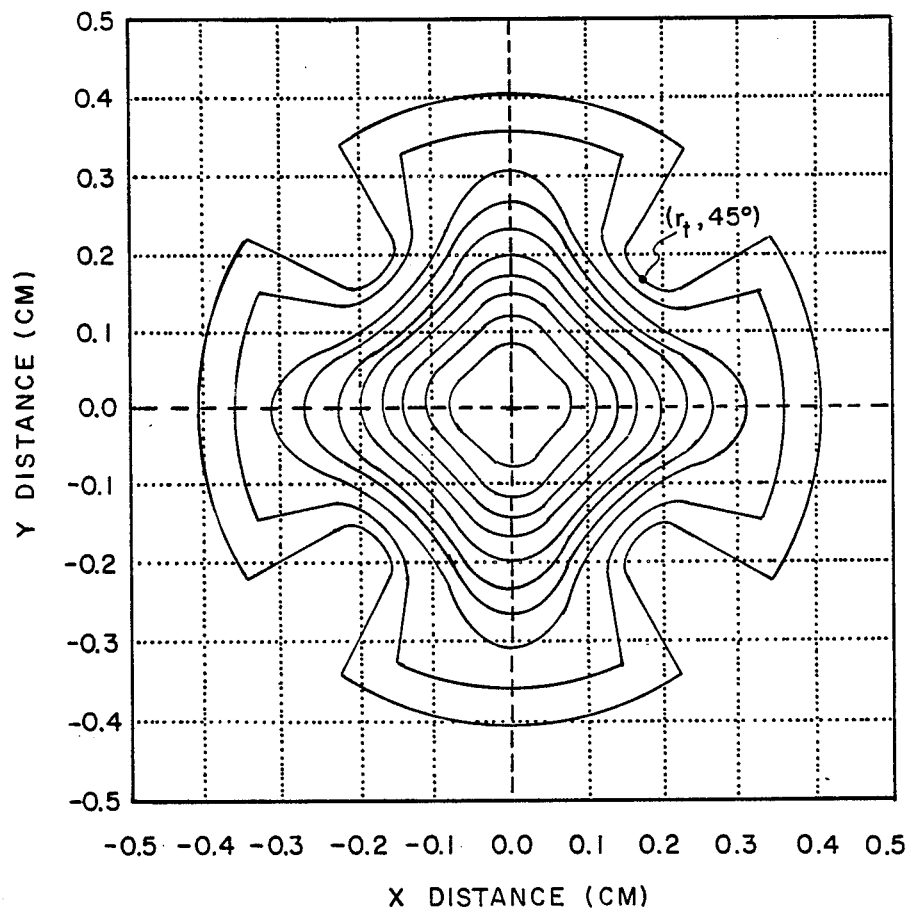
FIG. 5 is an intensity contour plot illustrating the beam profile in prior art laser resonators suffering from stress birefringence generated using Jones matrix analysis.

FIG. 5 shows a contour plot of the intensity of the output beam for a prior art resonator without the quarter-wave plates 16 and 18 of FIG. 1. This plot will be contrasted with the contour plot of FIG. 6 which illustrates the intensity of the output beam for the system of the present invention shown in FIG. 1. Both plots are generated from a Jones matrix analysis of the resonator for the two configurations (see R. C. Jones, "A New Calculus for the Treatment of Optical Systems", J. Opt. Soc. Am 31, 488, 1941).

The four-lobed pattern of FIG. 5 can be explained by considering the birefringence in the rod to consist of a radial component $\Delta n_r$ and a tangential component $\Delta n_\phi$ as shown in FIG. 3. For a light ray traveling through the rod along the X or Y axis, the birefringence $\Delta n_r$ and $\Delta n_{101}$ will not cause any birefringence-induced phase shift or result in depolarization. Thus, those beams along the axes of the rod experience only a net phase shift without any change in polarization. Therefore, the output polarizer does not reject those beams even as the amplitude of the birefringence increases along the axes. By contrast, a light ray traveling through a point 45 degrees between the X and Y axes, that is polarized in the X or Y direction, will sample both the tangential and radial components of the birefringence in equal amounts. Thus, that element will experience maximum birefringence-induced phase shift and resultant depolarization. The output polarizer will then reject the beam passing through the point (r, 45°) where the magnitude of the birefringence reaches a threshold for a given pump power. Thus, in a highly stressed YAG rod, placed in a polarized laser cavity, the intensity plot of the output beam matches the four-lobed pattern shown in FIG. 5, with more energy missing from the 45 degree directions than from the 0 or 90 degree directions.

Figure 6:
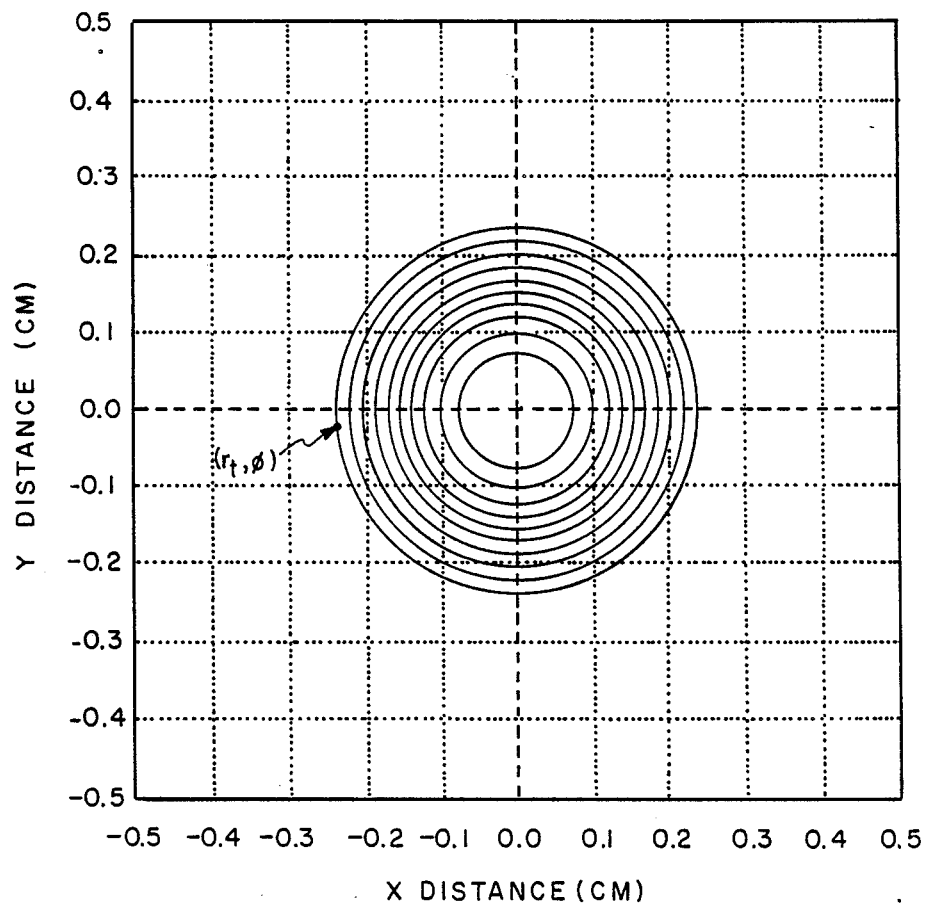
FIG. 6 is an intensity contour plot illustrating the beam profile of the laser resonator according to the present invention, generated using Jones matrix analysis.

By contrast, FIG. 6 shows the contour plot for the output beam in the system shown in FIG. 1. The quarter-wave plates are mounted, according to the present invention, so that light propagating through the lasing medium has essentially circular polarization, while elsewhere in the resonator the light has linear polarization. This is accomplished by placing the quarter-wave plates at 45 degrees to the input polarization direction, and so that the fast axis of the first polarizer 16 is aligned with the slow axis of the quarter-wave plate 18, and the fast axis of the quarter-wave plate 18 is aligned with the slow axis of the quarter-wave plate 16. In cases where light propagates along one of the 45 degree points in the rod, both components of the index of refraction change in the rod, $\Delta n_r$ and $\Delta n_{101}$, line up along one of the principal axis directions of the quarter-wave plates. Thus, a net phase shift is added to the polarization in each of the two principal directions as the ray traverses the rod. Upon emergence from the rod, the second quarter-wave plate effectively cancels out the original 90 degree phase shift produced by the input quarter-wave plate, resulting in a net phase shift proportional to $(\Delta n_r - \Delta n_{101})L$, where L is the length through the rod, and the proportionality constant is $2\pi/\lambda$, where $\lambda$ is the laser wavelength. Therefore, there is a remaining elliptical polarization component that is rejected by the output polarizer determined by the magnitude of $(\Delta n_r - \Delta n_\phi)$. In this case, the amount of energy lost due to rod birefringence is no different from the case where quarter-wave plates are not present. That is, the system behaves as though the quarter-wave plates are not there at all.

However, where the beam is passing along a point other than the 45 degree positions, for instance, for a vertically polarized ray entering the rod at a point along the x-axis of the rod, the ray is first split into two orthogonal components by the quarter-wave plate, with the slow component lagging in phase behind the fast component by 90 degrees. Birefringence in the rod will cause ellipticity of the beam as the fast and slow components both sample the tangential and radial components of the birefringence. Therefore, it can be seen that the birefringence in the rod is sampled along the X axis as well as along the 45 degree axis. In fact, the Jones matrix theoretical analysis for this configuration demonstrates that the birefringence will be symmetrically sampled such that at the output of the quarter-wave plate, the beam will consist of linearly polarized rays oriented as shown in FIG. 4.

It can be determined that the intensity of an output beam has a distribution determined by function $I = qr^2$ where q is a factor based on the amount of pump power in the rod inducing birefringence, and r is the distance from the center of the rod to the point of the ray in a radial coordinate system. As the birefringence increases with the radius squared, the polarization of the linear beam at the output of the second quarter-wave plate as shown in FIG. 2 will reach a point where it is totally rejected by the output polarizer. This point will define the effective radius of the beam, where $qr^2$ is a constant value producing a 90° shift in the polarization direction. Thus, for increase in heat, the size of the beam (r) will decrease. Since transmission through the rod is a function of the birefringence at any given point, and birefringence is a function of the radius and the power input, the transmission characteristics of the rod can be controlled by controlling the power input.

C. Controllable Apodizer/Beam Shaper

FIG. 7 illustrates a controllable apodizer or beam shaper 50 according to the present invention. The controllable apodizer or beam shaper is aligned along the axis of a beam of light 51 generated elsewhere. Aligned with the beam are a first polarizer 52, a first quarter-wave plate 53, an active medium 54, a second quarter-wave plate 55, and a second polarizer 56 or equivalent elements. The active medium 54 is a crystal exhibiting circularly symmetrical birefringent characteristics similar to those of the Nd:YAG rod; that is, as the active medium 54 is heated by a heating element 57 or other energy source, the index of refraction of the rod changes in a symmetrical distribution pattern according to the function $qr^2$, where q is a factor based on the temperature gradient of the rod 54 and r is the radius from the center of the rod to the point of the ray. In equivalent systems, the stress birefringence may be induced by pressure or other means for inducing the desired phenomenon.

As in the laser resonator of FIG. 1, the first polarizer 52 and second polarizer 56 are aligned. The first quarter-wave plate 53 is aligned so that its fast axis is at plus 45 degrees with respect to the orientation of the first polarizer 52. The second quarter-wave plate 55 is aligned so that its fast axis is aligned with the slow axis of the first quarter-wave plate 53 and its slow axis is aligned with the fast axis of the first quarter-wave plate 53.

By heating the active element 54, the apodizer or shaper 50 can be used to transform the input beam 51 of an irregular shape to a circular output beam 58 of controlled radius. The input beam 51 can be supplied from elsewhere, such as from a high powered laser medium, so that the shaping characteristics of the present invention can be applied to a wide variety of systems requiring round, linearly polarized beams of light.

Conclusion

The present invention provides an apparatus for achieving improved transverse symmetry in high powered laser systems. Further, the apparatus can be applied as an apodizer or beam shaper in a wide variety of environments.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for shaping a beam of laser light, wherein a beam of laser light is traveling along a propagation axis, comprising:

first polarizing means, mounted in alignment with the propagation axis, for passing plane-polarized laser light of a preferred orientation;

second polarizing means, mounted in alignment with the propagation axis, for passing plane-polarized laser light of the preferred orientation;

an active medium, having a longitudinal axis and mounted between the first and second polarizing means, with the longitudinal axis in alignment with the propagation axis, the active medium comprising a material exhibiting an induced stress birefringence;

first means, mounted in alignment with the propagation axis between the first polarizing means and the active medium, for inducing elliptical polarization of laser light traveling along the propagation axis from the first means through the active medium; and second means, mounted in alignment with the propagation axis between the first polarizing means and the active means, for cancelling the elliptical polarization induced by the first means of light propagating along the propagation axis from the active medium through the second means; and means, coupled to the active medium, and for inducing a controlled amount of stress in the active medium to cause stress birefringence in the active medium, whereby a beam propagating along the propagation axis through the apparatus is shaped by the second polarizing means in response to the controlled amount of stress, thereby resulting in a plane polarized laser beam with a shape indicative of a distribution of stress birefringence having a variable magnitude in the active medium.

2. The apparatus of claim 1, further including means for mounting the apparatus within a laser resonator.

3. The apparatus of claim 2, wherein the induced stress birefringence has a variable magnitude within the medium which is essentially azimuthally independent.

4. The apparatus of claim 1, wherein the magnitude of the stress birefringence at a position within the medium increases as distance of the position from the longitudinal axis increases.

5. The apparatus of claim 1, wherein the magnitude of the stress birefringence at a position within the medium increases in proportion to the square of distance of the position from the longitudinal axis.

6. The apparatus of claim 1, wherein the material of the active medium comprises a solid state material.

7. The apparatus of claim 1, wherein the material of the active medium comprises a crystal exhibiting cubic symmetry.

8. The apparatus of claim 1, wherein the material of the active medium consists essentially of YAG.

9. The apparatus of claim 1, wherein the material of the active medium consists essentially of glass.

10. The apparatus of claim 1, wherein the first means comprises a first quarter-wave plate aligned with a principal axis 45 degrees from the preferred orientation so that the elliptical polarization is essentially circular.

11. The apparatus of claim 10 wherein the second means comprises a second quarter-wave plate aligned to cancel the elliptical polarization induced by the first quarter-wave plate.

12. The apparatus of claim 1, wherein the means for inducing stress in the active medium comprises a heater.

13. The apparatus of claim 1, wherein the means for inducing stress comprises:

means for inducing heat in the active medium.

14. The apparatus of claim 1, wherein the medium is a laser active medium.

15. The apparatus of claim 1, wherein the shaped beam is essentially circular.

16. The apparatus of claim 1, wherein the medium comprises a cylindrical rod of the material.

17. A laser resonator, comprising:

a resonant cavity defining a resonant path, and including an output coupler supplying an output beam from a beam passing along the resonant path;

first polarizing means, mounted in the resonant path, for passing plane-polarized light of a preferred orientation;

second polarizing means, mounted in the resonant path, for passing plane-polarized light of the preferred orientation;

a laser active medium, having a longitudinal axis and mounted between the first and second polarizing means, with the longitudinal axis in the resonant path, the laser active medium comprising a material exhibiting induced stress birefringence having a distribution of magnitude that is azimuthally independent in planes perpendicular to the longitudinal axis;

first means, mounted in the resonant path between the first polarizing means and the laser active medium, for inducing elliptical polarization of light propagating along the resonant path through the first means toward the laser active medium; and second means, mounted in the resonant path between the second polarizing means and the laser active medium, for cancelling the elliptical polarization induced by the first means of light propagating along the resonant path from the laser active medium through the second means; and means, coupled to the laser active medium, for exciting the laser active medium and inducing stress in the laser active medium to cause stress birefringence, whereby size and shape of the output beam are controlled upon passing along the resonant path in response to the induced stress.

18. The laser resonator of claim 17, wherein the shape of the output beam is circular.

19. The laser resonator of claim 17, wherein the material of the laser active medium comprises a solid state material.

20. The laser medium of claim 17, wherein the material of the laser active medium comprises a crystal exhibiting cubic symmetry.

21. The laser resonator of claim 17, wherein the material of the laser active medium consists essentially of Nd:YAG.

22. The laser resonator of claim 17, wherein the material of the laser active medium consists essentially of Nd:glass.

23. The laser resonator of claim 17, wherein the first means comprises a first quarter-wave plate aligned with a principal axis 45 degrees from the preferred orientation so that the elliptical polarization is essentially circular.

24. The laser resonator of claim 23, wherein the second means comprises a second quarter-wave plate aligned to cancel the elliptical polarization induced by the first quarter-wave plate.

25. The laser resonator of claim 17, wherein the means for exciting and inducing stress in the laser active medium comprises a laser pump that induces heat in the laser active medium.

26. The laser resonator of claim 17, wherein the means for exciting and inducing stress comprises:
means for inducing heat in the laser active medium.

27. The laser resonator of claim 17, wherein the stress is essentially circularly symmetrical.

28. The laser resonator of claim 17, wherein the laser active medium comprises a cylindrical rod of the material.

* * * * *